United States Patent
Kratzer et al.

(10) Patent No.: US 7,285,513 B2
(45) Date of Patent: Oct. 23, 2007

(54) PREPARATION OF CATALYST SYSTEMS

(75) Inventors: Roland Kratzer, Hofheim (DE); Volker Fraaije, Frankfurt (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 10/521,076

(22) PCT Filed: Jul. 14, 2003

(86) PCT No.: PCT/EP03/07567

§ 371 (c)(1), (2), (4) Date: Feb. 7, 2005

(87) PCT Pub. No.: WO2004/007569

PCT Pub. Date: Jan. 22, 2004

(65) Prior Publication Data

US 2005/0272596 A1    Dec. 8, 2005

Related U.S. Application Data

(60) Provisional application No. 60/401,206, filed on Aug. 5, 2002.

(30) Foreign Application Priority Data

Jul. 15, 2002  (DE) .............................. 102 32 083

(51) Int. Cl.
*B01J 31/12* (2006.01)
*B01J 31/14* (2006.01)

(52) U.S. Cl. ............... 502/118; 502/103; 502/104; 502/125; 526/160; 526/943

(58) Field of Classification Search ............... 502/118, 502/103, 125, 104; 526/160, 943
See application file for complete search history.

(56) References Cited

U.S. PATENT DOCUMENTS

| | | | |
|---|---|---|---|
| 1,048,688 A | 12/1912 | Gruen | |
| 4,268,418 A | 5/1981 | Hoff | |
| 6,391,989 B1 * | 5/2002 | Bohnen et al. | 526/134 |
| 6,420,301 B1 * | 7/2002 | Kristen et al. | 502/155 |
| 6,433,111 B1 * | 8/2002 | Kristen et al. | 526/141 |
| 6,500,907 B1 * | 12/2002 | Suling et al. | 526/127 |
| 6,576,723 B1 | 6/2003 | Bohnen et al. | |
| 6,608,224 B2 * | 8/2003 | Resconi et al. | 556/27 |
| 6,784,261 B1 | 8/2004 | Schopf et al. | |
| 6,784,305 B2 * | 8/2004 | Schulte et al. | 556/53 |
| 6,861,384 B2 * | 3/2005 | Schottek et al. | 502/123 |
| 6,864,208 B2 * | 3/2005 | Suling et al. | 502/111 |
| 6,872,843 B2 * | 3/2005 | Schottek et al. | 556/11 |
| 6,924,248 B2 * | 8/2005 | Mihan et al. | 502/132 |

FOREIGN PATENT DOCUMENTS

| | | |
|---|---|---|
| DE | 197 10 615 | 8/1998 |
| EP | 0 461 222 B1 | 12/1991 |
| EP | 0 461 222 B2 | 12/1991 |
| WO | WO-91/09822 | 7/1991 |
| WO | WO-91/09882 | 7/1991 |
| WO | WO-98/22486 | 5/1998 |
| WO | WO-99/21896 | 5/1999 |
| WO | WO 9943717 A1 * | 9/1999 |
| WO | WO-99/61487 | 12/1999 |
| WO | WO-00/31090 | 6/2000 |
| WO | WO-01/09148 | 2/2001 |

OTHER PUBLICATIONS

Small et al., "Highly Active Iron and Cobalt Catalysts for the Polymerization of Ethylene", *J. Am. Chem Soc.*, 120, pp. 4049-4050 (1998).

Wiesenfeldt et al., "*ansa*-Metallocene derivatives XVII. Rademic and *meso* diastereomers of group IV metallocene derivatives with symmetrically substituted, dimethylsilanediyul-bridged ligand frameworks. Crystal structure of $R,S$-Me$_2$Si(3-t-Bu-5-MeC$_5$H$_2$)$_2$ZrCl$_2$", *Journal of Organometallic Chemistry*, 369, pp. 359-370 (1989).

Chien et al., "Olefin copolymerization and olefin/diene terpolymerization with a zirconocenium catalyst system", *Makromol. Chem., Rapid Commun.* 14, pp. 109-114 (1993).

Enders et al., "8-Quinolylcyclopendadienyl, a Ligand with a Tailored Fit for Chelate Complexes", *Chem. Ber.*, 129 pp. 459-463 (1996).

Britovsek et al., "Novel olefin polymerization catalysts based on iron and cobalt", *Chem. Commun.*, pp. 849-850 (1998).

Jutzi, et al., "Cyclopentadienyl compounds with nitrogen donors in the side-chain," *Journal of Organometallic Chemistry*, 500, pp. 175-185 (1995).

* cited by examiner

*Primary Examiner*—David M Brunsman
(74) *Attorney, Agent, or Firm*—Connolly Bove Lodge & Hutz LLP

(57) ABSTRACT

The present invention relates to a process for preparing a catalyst for olefin polymerization which is obtainable by bringing
A) at least one organic transition metal compound,
B) a mixture of at least two different organo metallic compounds and
C) at least one cation-forming compound
into contact with one another, wherein the organic transition metal compound A) is firstly brought into contact with the mixture of the organo metallic compounds B). In addition, the invention relates to the use of the catalyst for olefin polymerization, to catalysts obtainable by this process and to a process for the polymerization of olefins in which these catalysts are used.

10 Claims, No Drawings

PREPARATION OF CATALYST SYSTEMS

RELATED APPLICATION

This application is a national stage application (under 35 U.S.C. 371) of PCT/EP2003/007567 filed Jul. 14, 2003, which claims benefit to German application Serial Number 102 32 083.7 filed Jul. 15, 2002 and U.S. Provisional application Ser. No. 60/401,206 filed Aug. 5, 2002.

The present invention relates to a process for preparing a catalyst for olefin polymerization which is obtainable by bringing at least one organic transition metal compound, a mixture of at least two different organometallic compounds and at least one cation-forming compound into contact wit one another, to the use of the catalyst for olefin polymerization, to catalysts obtainable by this process and to a process for the polymerization of oletins in which these catalysts are used.

Organic transition metal compounds such as metallocene complexes are of great interest as catalysts for olefin polymerization since they make it possible to synthesize polyolefins which cannot be obtained using conventional Ziegler-Natta catalysts. For example, such single site catalysts lead to polymers having a narrow molar mass distribution and a uniform comonomer content.

For organic transition metal compounds such as metallocene complexes to be active as catalysts for olefin polymerization it is necessary for them to be reacted with further compounds which serve as cocatalysts. One frequently used class of cocatalysts consists of aluminoxanes such as methylaluminoxane (MAO). Further compounds which can be used as cocatalysts are compounds which convert the organic transition metal compounds into cationic complexes.

In the preparation of olefin polymerization catalysts based on organic transition metal compounds, the organic transition metal compounds are frequently reacted with an organometallic compound such as an aluminum alkyl before they are brought into contact with the further components of the catalyst, e.g. cocatalysts or supports. Particularly in the case of sparingly soluble organic transition metal compounds, it has been found that a series of problems such as deposit fonnation in the reactor or an unsatisfact ry catalyst activity can occur.

It is an object of the present invention to find a process for preparing catalysts for olefin polymerization which is relatively simple and leads to catalysts having an increased polymerization activity or requires a reduced amount of expensive starting materials such as boron-containing compounds or transition metal compounds for the same polymerization activity. At the same time, polymerization without formation of deposits in the reactor should be possible.

We have found that this object is achieved by a process for preparing a catalyst for olefin polymerization which is obtainable by bringing A) at least one organic transition metal compound,
B) a mixture of at least two different organo metallic compounds and
C) at least one cation-forming compound into contact with one another, wherein the organic transition metal compound A) is firstly brought into contact with the mixture of the organo metallic compounds B).

Furthermore, we have found the use of the catalyst for olefin polymerization, catalysts obtainable by this process and a process for the polymerization of olefins in which these catalysts are used.

The catalysts prepared according to the present invention are suitable for the polymerization of olefins and especially for the polymerization of α-olefins, i.e. hydrocarbons having terminal double bonds. Suitable monomers include functionalized olefinically unsaturated compounds such as ester or amide derivatives of acrylic or methacrylic acid, for example acrylates, methacrylates or acrylonitrile. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene. It is also possible to polymerize mixtures of various α-olefins.

Suitable olefins also include ones in which the double bond is part of a cyclic structure which may comprise one or more ring systems. Examples of such olefins are cyclopentene, norbornene, tetracyclododecene and methylnorbomene and dienes such as 5-ethylidene-2-norbornene, norbornadiene and ethylnorbomadiene.

It is also possible to polymerize mixtures of two or more olefins.

The catalysts of the present invention are particularly useful for the polymerization or copolymerization of ethylene or propylene. As comonomers in ethylene polymerization, preference is given to using $C_3$-$C_8$-α-olefins, in particular 1-butene, 1-pentene, 1-hexene and/or 1-octene. Preferred comonomers in propylene polymerization are ethylene and/or 1-butene.

As organic transition metal compound A), it is in principle possible to use any compounds of the transition metals of groups 3 to 12 of the Periodic Table or the lanthanides which contain organic groups and preferably form active olefin polymerization catalysts after reaction with the components B) and C). These are usually compounds in which at least one monodentate or polydentate ligand is bound to the central atom via sigma or pi bonds. Possible ligands include ones containing cyclopentadienyl radicals and also ones which are free of cyclopentadienyl radicals. A large number of such-compounds A) suitable for olefin polymerization are described in Chem. Rev. 2000, Vol. 100, No. 4. Furthermore, polycyclic cyclopentadienyl complexes are also suitable for olefin polymerization.

Particularly useful organic transition metal compounds A) are ones containing at least one cyclopentadienyl-type ligand. Those containing two cyclopentadienyl-type ligands are commonly referred to as metallocene complexes. Among organic transition metal compounds A) containing at least one cyclopentadienyl-type ligand, compounds which have been found to be particularly suitable are those of the formula (I)

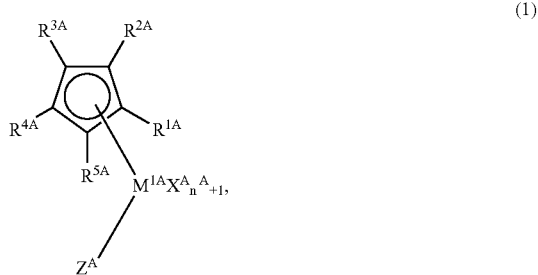

where the substituents and indices have the following meanings:

$M^{1A}$ is titanium, zirconium, hafnium, vanadium, niobium, tantalum, chromium, molybdenum or tungsten, or en element of group 3 of the Periodic Table and the lanthanides, $X^A$ are identical or different and are each, independently of one another, fluorine, chlorine, bromine, iodine, hydrogen, $C_1$-$C_{10}$-alkyl, $C_2$-$C_{10}$-alkenyl, $C_6$-$C_{15}$-aryl, $C_7$-$C_{40}$-alkylaryl, $C_7$-$C_{40}$-arylalkyl, —$OR^{6A}$ or —$NR^{6A}R^{7A}$ or two radicals $X^A$ are joined to one another and together form, for example, a substituted or unsubstituted diene ligand, in particular a 1,3-diene ligand, or a biaryloxy group, where $R^{6A}$ and $R^{7A}$ are each $C_1$-$C_{10}$-alkyl, $C_6$-$C_{15}$-aryl, $C_7$-$C_{40}$-arylalkyl, $C_7$-$C_{40}$alkylaryl, fluoroalkyl or fluoroaryl each having from 1 to 16 carbon atoms in the alkyl radical and from 6 to 21 carbon atoms in the aryl radical, $n^A$ is 1, 2 or 3, where $n^A$ is such that the metallocene complex of the formula (I) is uncharged for the given valence of M, $R^{1A}$ to $R^{5A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{8A}_2$, —$N(SiR^{8A}_3)_2$, —$OR^{8A}$, —$OSiR^{8A}_3$, —$SiR^{8A}_3$, where the radicals $R^{1A}$ to $R^{5A}$ may also be substituted by halogen or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which contains at least one atom selected from the group consisting of N, P, O and S, where $R^{8A}$ are identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^A$ is as defined for $X^A$ or is

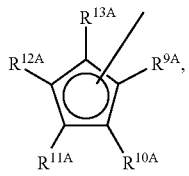

where the radicals $R^{9A}$ to $R^{13A}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, $C_7$-$C_{40}$-arylalkyl, $C_7$-$C_{40}$-alkylaryl, —$NR^{14A}_2$, —$N(SiR^{14A}_3)_2$, —$OR^{14A}$, —$OSiR^{14A}_3$, —$SiR^{14A}_3$, where the radicals $R^{1A}$ to $R^{5A}$ may also be substituted by halogen and/or two radicals $R^{1A}$ to $R^{5A}$, in particular adjacent radicals, together with the atoms connecting them may be joined to form a preferably five-, six- or seven-membered ring or a preferably five-, six- or seven-membered heterocycle which contains at least one atom selected from the group consisting of N, P, O and S, where $R^{14A}$ are identical or different and can each be $C_1$-$C_{10}$-alkyl, $C_3$-$C_{10}$-cycloalkyl, $C_6$-$C_{15}$-aryl, $C_1$-$C_4$-alkoxy or $C_8$-$C_{10}$-aryloxy, or the radicals $R^{4A}$ and $Z^A$ together form an —$R^{15A}_{V^A}$-$A^A$- group, where $R^{15A}$ is

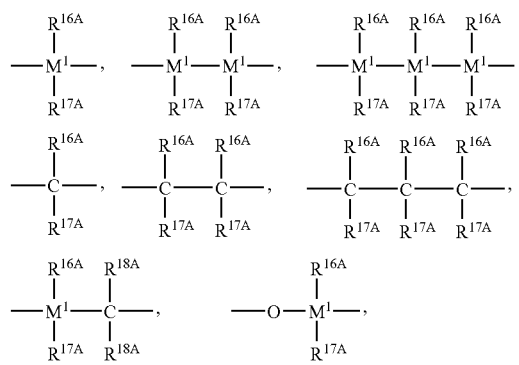

where $R^{16A}$, $R^{17A}$ and $R^{18A}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2A}$ is silicon, germanium or tin, preferably silicon, $A^A$ is —O—, —S—, —$NR^{19A}$, —$PR^{19A}$, —O—$R^{19A}$, —$NR^{19A}_2$, —$PR^{19A}_2$ or an unsubstituted, substituted or fused, heterocyclic ring system, where $R^{19A}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or —Si($R^{20A}$)$_3$, $R^{20A}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, $V^A$ is 1 or, if $A^A$ is an unsubstituted, substituted or fused, heterocyclic ring system, 1 or 0 or the radicals $R^{4A}$ and $R^{12A}$ together form an —$R^{15A}$— group.

It is preferred that the radicals $X^A$ in the formula (I) are identical, preferably fluorine, chlorine, bromine, $C_1$-$C_7$-alkyl or arylalkyl, in particular chlorine, methyl or benzyl.

Among the organic transition metal compounds of the formula (I), preference is given to (Ia)

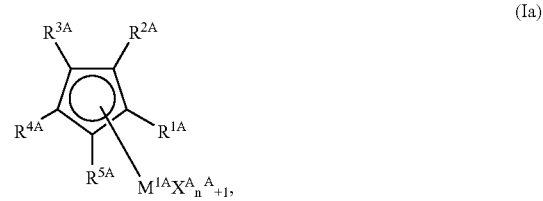

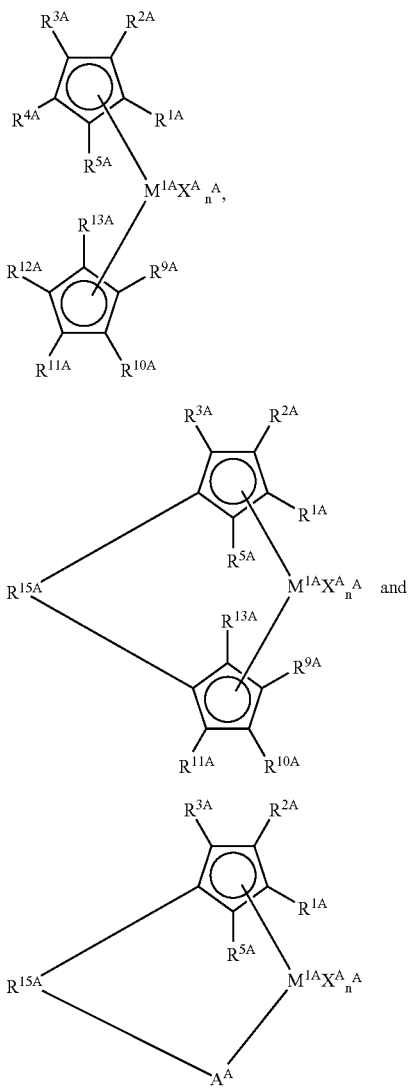

Among the compounds of the formula (Ia); particular preference is given to those in which
$M^{1A}$ is titanium or chromium,
$X^A$ is chlorine, $C_1$-$C_4$-alkyl, phenyl, alkoxy or aryloxy,
$n^A$ is 1 or 2 and
$R^{1A}$ to $R^{5A}$ are each hydrogen or $C_1$-$C_4$-alkyl or two adjacent radicals $R^{1A}$ to $R^{5A}$ together with the atoms connecting them form a substituted or unsubstituted unsaturated six-membered ring.

Among the metallocenes of the formula (Ib), preference is given to those in which
$M^{1A}$ is titanium, zirconium, hafnium or chromium,
$X^A$ is chlorine, $C_1$-$C_4$-alkyl or benzyl, or two radicals X form a substituted or unsubstituted butadiene ligand,
$n^A$ is 1 or 2, preferably 2, or, if $M^{1A}$ is chromium, 0,
$R^{1A}$ to $R^{5A}$ are each hydrogen, $C_1$-$C_8$-alkyl, $C_6$-$C_{10}$-aryl, —$NR^{8A}_2$, —$OSiR^{8A}_3$, $SiR^{8A}_3$ or —$Si(R^{8A})_3$ and
$R^{9A}$ to $R^{13A}$ are each hydrogen, $C_1$-$C_8$-alkyl, $C_6$-$C_{10}$-aryl, —$NR^{8A}_2$, —$OSiR^{8A}_3$, —$SiR^{8A}_3$ or —$Si(R^{8A})_3$
or in each case two radicals $R^{1A}$ to $R^{5A}$ and/or $R^{9A}$ to $R^{13A}$ together with the cyclopentadienyl ring form an indenyl or substituted indenyl system.

Particularly useful compounds of the formula (Ib) are those in which the cyclopentadienyl radicals are identical.

Examples of particularly useful compounds of the formula (Ib) are
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(1-n-butyl-3-methylcyclopentadienyl)zirconium dichloride,
bis(indenyl)zirconium dichloride,
bis(tetrahydroindenyl)zirconium dichloride and
bis(trimethylsilylcyclopentadienyl)zirconium dichloride and also the corresponding dimethylzirconium compounds.

Particularly useful metallocenes of the formula (Ic) are those in which
$R^{1A}$ and $R^{9A}$ are identical or different and are each hydrogen or a $C_1$-$C_{10}$-alkyl group,
$R^{5A}$ and $R^{13A}$ are identical or different and are each hydrogen or a methyl, ethyl, isopropyl or tert-butyl group,
$R^{3A}$ and $R^{11A}$ are each $C_1$-$C_4$-alkyl and
$R^{2A}$ and $R^{10A}$ are each hydrogen or two adjacent radicals $R^{2A}$ and $R^{3A}$ or $R^{10A}$ and $R^{11A}$ together form a saturated or unsaturated cyclic group having from 4 to 44 carbon atoms,
$R^{15A}$ is -$M^{2A}R^{16A}R^{17A}$— or —$CR^{16A}R^{17A}$—$CR^{16A}R^{17A}$— or —$BR^{16A}$— or —$BNR^{16A}R^{17A}$—,
$M^{1A}$ is titanium, zirconium or hafnium and
$X^A$ are identical or different and are each chlorine, $C_1$-$C_4$-alkyl, benzyl, phenyl or $C_7$-$C_{15}$-alkylaryloxy.

Particularly useful compounds of the formula (Ic) are those of the formula (Ic')

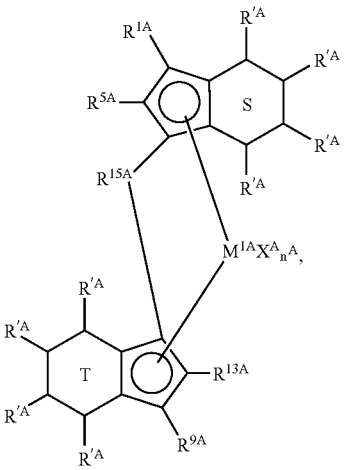

where
the radicals $R^A$ are identical or different and are each hydrogen, $C_1$-$C_{10}$-alkyl or $C_3$-$C_{10}$-cycloalkyl, preferably methyl, ethyl, isopropyl or cyclohexyl, $C_6$-$C_{20}$-aryl, preferably phenyl, naphthyl or mesityl, $C_7$-$C_{40}$-arylalkyl, $C_7$-$C_{40}$-alkylaryl, preferably 4-tert-butylphenyl or 3,5-di-tert-butylphenyl, or $C_8$-$C_{40}$-arylalkenyl, $R^{5A}$ and $R^{13A}$ are identical or different and are each hydrogen, $C_1$-$C_6$-alkyl, preferably methyl, ethyl, isopropyl, n-propyl, n-butyl, n-hexyl or tert-butyl, and the rings S and T are identical or different saturated, unsaturated or partially saturated.

The indenyl or tetrahydroindenyl ligands of the metallocenes of the formula (Ic') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, with the following nomenclature being employed for the site of substitution:

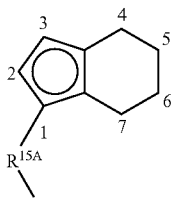

As complexes (Ic'), preference is given to using bridged bisindenyl complexes in the rac or pseudo-rac form. For the present purposes, the pseudo-rac form refers to complexes in which the two indenyl ligands are in the rac arrangement relative to one another when all other substituents of the complex are disregarded.

Examples of particularly useful metallocenes (Ic) and (Ic') are
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methyl-4,5-benzindenyl)zirconium dichloride
dimethylsilanediylbis(2-ethyl-4,5-benzindenyl)zirconium dichloride
methylphenylsilanediylbis(2-methyl-4,5-benzindenyl)zirconium dichloride,
methylphenylsilanediylbis(2-ethyl-4,5-benzindenyl)zirconium dichloride,
diphenylsilanediylbis(2-methyl-4,5-benzindenyl)zirconium dichloride,
diphenylsilanediylbis(2-ethyl-4,5-benzindenyl)zirconium dichloride,
diphenylsilanediylbis(2-methylindenyl)hafnium dichloride,
dimethylsilanediylbis(2-methyl-4-phenylindenyl)zirconium dichloride,
dimethylsilanediylbis(2-ethyl-4-phenylindenyl)zirconium dichloride,
dimethylsilanediylbis(2-methyl-4-(1-naphthyl)indenyl)zirconium dichloride,
dimethylsilanediylbis(2-ethyl-4-(1-naphthyl)indenyl)zirconium dichloride,
dimethylsilanediylbis(2-propyl-4-(1-naphthyl)indenyl)zirconium dichloride,
dimethylsilanediylbis(2-i-butyl-4-(1-naphthyl)indenyl)zirconium dichloride,
dimethylsilanediylbis(2-propyl-4-(9-phenanthryl)indenyl)zirconium dichloride,
dimethylsilanediylbis(2-methyl-4-isopropylindenyl)zirconium dichloride,
dimethylsilanediylbis(2,7-dimethyl-4-isopropylindenyl)zirconium dichloride,
dimethylsilanediylbis(2-methyl-4,6-diisopropylindenyl)zirconium dichloride,
dimethylsilanediylbis(2-methyl-4-[p-trifluoromethylphenyl]indenyl)zirconium dichloride,
dimethylsilanediylbis(2-methyl-4-[3',5'-dimethylphenyl]indenyl)zirconium dichloride,
dimethylsilanediylbis(2-methyl-4-[4'-tert-butylphenyl]indenyl)zirconium dichloride,
diethylsilanediylbis(2-methyl-4-[4'-tert-butylphenyl]indenyl)zirconium dichloride,
dimethylsilanediylbis(2-ethyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride,
dimethylsilanediyl(2-isopropyl-4-phenylindenyl)-(2-methyl-4-phenylindenyl)zirconium dichloride,
dimethylsilanediyl(2-isopropyl-4-(1-naphthyl)indenyl)-(2-methyl-4-(1-naphthyl)indenyl)zirconium dichloride,
dimethylsilanediyl(2-isopropyl-4-[4'-tert-butylphenyl]indenyl)-(2-methyl-4-[4'-tert-butylphenyl]-indenyl)zirconium dichloride,
dimethylsilanediyl(2-isopropyl-4-[4'-tert-butylphenyl]indenyl)-(2-ethyl-4-[4'-tert-butylphenyl]-indenyl)zirconium dichloride,
dimethylsilanediyl(2-isopropyl-4-[4'-tert-butylphenyl]indenyl)-(2-methyl-4-[3',5'-bis-tert-buthylphenyl]indenyl)zirconium dichloride,
dimethylsilanediyl(2-isopropyl-4-[4'-tert-butylphenyl]indenyl)-(2-methyl-4-[1'-naphthyl]indenyl)-zirconium dichloride and
ethylene(2-isopropyl-4-[4'-tert-butylphenyl]indenyl)-(2-methyl-4-[4'-tert-butylphenyl]indenyl)-zirconium dichloride and the corresponding dimethylzirconium, monochloromono(alkylaryloxy)zirconium and di-(alkylaryloxy)zirconium compounds.

Particularly useful compounds of the formula (Id) are those in which
$M^{1A}$ is titanium or zirconium, in particular titanium, and $X^A$ is chlorine, $C_1$-$C_4$-alkyl or phenyl or two radicals X together form a substituted or unsubstituted butadiene ligand, $R^{15A}$ is —$SiR^{16A}R^{17A}$— or —$CR^{16A}R^{17A}$—$CR^{16A}R^{17A}$—, and $A^A$ is —O—, —S— or —$NR^{19A}$—, $R^{1A}$ to $R^{3A}$ and $R^{5A}$ are each hydrogen, $C_1$-$C_{10}$-alkyl, preferably methyl, $C_3$-$C_{10}$-cycloalkyl, $C_6$-$C_{15}$-aryl or —Si$(R^{8A})_3$, or two adjacent radicals form a cyclic group having from 4 to 12 carbon atoms, with particular preference being given to all $R^{1A}$ to $R^{3A}$ and $R^{5A}$ being methyl.

Another group of compounds of the formula (Id) which are particularly useful are those in which $M^{1A}$ is titanium or chromium, preferably in the oxidation state III and $X^A$ is chlorine, $C_1$-$C_4$-alkyl or phenyl or two radicals $X^A$ form a substituted or unsubstituted butadiene ligand, $R^{15A}$ is —$SiR^{16A}R^{17A}$— or —$CR^{16A}R^{17A}$—$CR^{18A}R^{17A}$—, and $A^A$ is —O—$R^{19A}$, —$NR^{19A}{}_2$, —$PR^{19A}{}_2$, $R^{1A}$ to $R^{3A}$ and $R^{5A}$ are each hydrogen, $C_1$-$C_{10}$-alkyl, $C_3$-$C_{10}$-cloalkyl, $C_6$-$C_{15}$-arly or —Si$(R^{8A})_3$, or two adjacent radicals form a cyclic group having from 4 to 12 carbon atoms.

The synthesis of such complexes can be carried out by methods known per se, with preference being given to the reaction of the appropriately substituted, cyclic hydrocarbon anions with halides of titanium, zirconium, hafnium, vanadium, niobium, tantalum or chromium.

Examples of appropriate preparative methods are described, for example, in Journal of Organometallic Chemistry, 369 (1989), 359-370.

Further suitable organic transition-metal compounds A) are metallocenes having at least one ligand which is formed by a cyclopentadienyl or heterocyclopentadienyl and a fused-on heterocycle. In the heterocycles, at least one carbon atom is replaced by a heteroatom, preferably from group 15 or 16 of the Periodic Table and in particular nitrogen or sulfur. Such compounds are described, for example, in WO 98/22486. These are, in particular, dimethylsilanediyl(2-methyl-4-phenylindenyl)-(2,5-dimethyl-N-phenyl-4-azapentalene)zirconium dichloride, dimethylsilanediylbis(2-methyl-4-phenyl-4-hydroazulenyl) zirconium dichloride and dimethylsilanediylbis(2-ethyl-4-phenyl-4-hydroazulenyl) zirconium dichloride.

Further examples of organic transition metal compounds A) which are suitable for the purposes of the present invention are transition metal complexes with at least one ligand of the formulae (IIa) to (IIe),

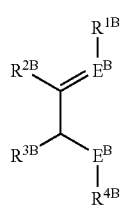

(IIa)

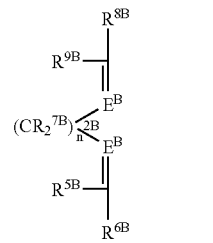

(IIb)

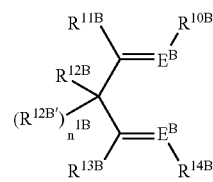

(IIc)

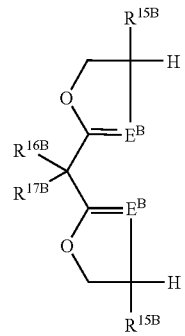

(IId)

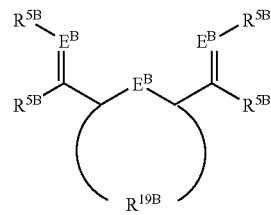

(IIe)

where the transition metal is selected from among the elements Ti, Zr, Hf, Sc, V, Nb, Ta, Cr, Mo, W, Fe, Co, Ni, Pd, Pt or is an element of the rare earth metals. Preference is given to compounds containing nickel, iron, cobalt or palladium as central metal.

$E^B$ is an element of group 15 of the Periodic Table of the Elements, preferably N or P, particularly preferably N. The two or three atoms $E^B$ in a molecule can be identical or different The radicals $R^{1B}$ to $R^{19B}$, which can be identical or different within a ligand system of the formulae (IIa) to (IIe), have the following meanings:

$R^{1B}$ and $R^{4B}$ are, independently of one another, hydrocarbon or substituted hydrocarbon radicals, preferably hydrocarbon radicals in which the carbon atom adjacent to the element $E^B$ is connected to at least two carbon atoms, $R^{2B}$ and $R^{3B}$ are each, independently of one another, hydrogen or a hydrocarbon or substituted hydrocarbon radical, where $R^{2B}$ and $R^{3B}$ may also together form a ring system in which one or more heteroatoms may be present, $R^{6B}$ and $R^{8B}$ are, independently of one another, hydrocarbon or substituted hydrocarbon radicals, $R^{5B}$ and $R^{9B}$ are each, independently of one another, hydrogen or a hydrocarbon or substituted hydrocarbon radical, where $R^{6B}$ and $R^{5B}$ or $R^{8B}$ and $R^{9B}$ may also together form a ring system, $R^{7B}$ are each, independently of one another, hydrogen or a hydrocarbon or substituted hydrocarbon radical, where two $R^{7A}$ may also together form a ring system, $R^{10B}$ and $R^{14B}$ are, independently of one another, hydrocarbon or substituted hydrocarbon radicals, $R^{11B}$, $R^{12B}$, $R^{12B'}$ and $R^{13B}$ are each, independently of one another hydrogen or a hydrocarbon or substituted hydrocarbon radical, where two or more geminal or vicinal radicals $R^{11B}$, $R^{12B}$, $R^{12B'}$ and $R^{13B}$ may also together form a ring system, $R^{15B}$ and $R^{18B}$ are each, independently of one another, hydrogen or a hydrocarbon or substituted hydrocarbon radical, $R^{16B}$ and $R^{17B}$ are each, independently of one another, hydrogen or a hydrocarbon or substituted hydrocarbon radical, $R^{19B}$ is an organic radical which forms a 5- to 7-membered substituted or unsubstituted, in particular unsaturated or aromatic, heterocyclic ring system, in particular together with $E^B$ a pyridine system, $n^{1B}$ is 0 or 1, with compounds of the formula (IIc) in which $n^{1B}$ is 0 being negatively charged, and $n^{2B}$ is an integer from 1 to 4, preferably 2 or 3

Particularly useful transition metal complexes with ligands of the formulae (IIa) to (IId) are, for example, complexes of the transition metals Fe, Co, Ni, Pd or Pt with ligands of the formula (IIa). Particular preference is given to diimine complexes of Ni or Pd, e.g.:

di(2,6-di-i-propylphenyl)-2,3-dimethyldiazabutadienepalladium dichloride,
di(di-i-propylphenyl)-2,3-dimethyldiazabutadienenickel dichloride,
di(2,6-di-i-propylphenyl)-2,3-dimethyldiazabutadienedimethylpalladium,
di(2,6-di-i-propylphenyl)-2,3-dimethyldiazabutadienedimethylnickel,
di(2,6-dimethylphenyl)-2,3-dimethyldiazabutadienepalladium dichloride,
di(2,6-dimethylphenyl)-2,3-dimethyldiazabutadienenickel dichloride,
di(2,6-dimethylphenyl)-2,3-dimethyldiazabutadienedimethylpalladium,
di(2,6-dimethylphenyl)-2,3-dimethyldiazabutadienedimethylnickel,
di(2-methylphenyl)-2,3-dimethyldiazabutadienepalladium dichloride,
di(2-methylphenyl)-2,3-dimethyldiazabutadienenickel dichloride,
di(2-methylphenyl)-2,3-dimethyldiazabutadienedimethylpalladium,
di(2-methylphenyl)-2,3-dimethyldiazabutadienedimethylnickel;
diphenyl-2,3-dimethyldiazabutadienepalladium dichloride,
diphenyl-2,3-dimethyldiazabutadienenickel dichloride,
diphenyl-2,3-dimethyldiazabutadienedimethylpalladium,
diphenyl-2,3-dimethyldiazabutadienedimethylnickel,
di(2,6-dimethylphenyl)azanaphthenepalladium dichloride,
di(2,6-dimethylphenyl)azanaphthenenickel dichloride,
di(2,6-dimethylphenyl)azanaphthenedimethylpalladium,
di(2,6-dimethylphenyl)azanaphthenedimethylnickel,
1,1'-bipyridylpalladium dichloride,
1,1'-bipyridylnickel dichloride,
1,1'-bipyridyldimethylpalladium or
1,1'-bipyridyldimethylnickel.

Particularly useful compounds (IIe) are those which are described in J. Am. Chem. Soc. 120, p. 4049 ff. (1998), J. Chem. Soc., Chem. Commun. 1998, 849. As complexes containing ligands (IIe), preference is given to using 2,6-bis(imino)pyridyl complexes of the transition metals Fe, Co, Ni, Pd or Pt, in particular Fe.

As organic transition metal compounds A), it is also possible to use iminophenoxide complexes whose ligands are prepared, for example, from substituted or unsubstituted salicylaldehydes and primary amines, in particular substituted or unsubstituted arylamines. Transition metal complexes with pi ligands which contain one or more heteroatoms in the pi system, for example the boratabenzene ligand, the pyrrolyl anion or the phospholyl anion, can also be used as organic transition metal compounds A).

Further transition metal compounds A) which are suitable for the purposes of the present invention are substituted monocyclopentadienyl, monoindenyl, monofluorenyl or heterocyclopentadienyl complexes of chromium, molybdenum or tungsten in which at least one of the substituents on the cyclopentadienyl ring bears a rigid donor function which is not bound exclusively via $sp^3$-hybridized carbon or silicon atoms. The most direct link to the donor function contains at least one sp- or $sp^2$-hybridized carbon atom, preferably from one to three $sp^2$-hybridized carbon atoms. The direct link preferably comprises an unsaturated double bond, an aromatic or together with the donor forms a partially unsaturated or aromatic heterocyclic system.

In these transition metal compounds, the cyclopentadienyl ring can also be a heterocyclopentadienyl ligand, i.e. at least one carbon atom can also be replaced by a heteroatom from group 15 or 16. In this case, preference is given to a carbon atom in the $C_5$-ring being replaced by phosphorus. In particular, the cyclopentadienyl ring is substituted by further alkyl groups which can also form a five- or six-membered ring, e.g. tetrahydroindenyl, indenyl, benzindenyl or fluorenyl.

Possible donors are uncharged functional groups containing an element of group 15 or 16 of the Periodic Table, e.g. amine, imine, carboxamide, carboxylic ester, ketone (oxo), ether, thioketone, phosphine, phosphite, phosphine oxide, sulfonyl, sulfonamide, or unsubstituted, substituted or fused, partially unsaturated heterocyclic or heteroaromatic ring systems.

Preference is here given to using substituted monocyclopentadienyl, monoindenyl, monofluorenyl or heterocyclopentadienyl complexes of the formula (III)

where
$M^C$ is chromium, molybdenum or tungsten and
$Z^C$ has the formula (IIIa)

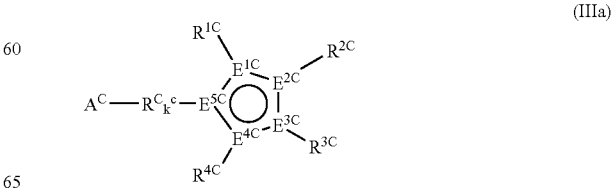

where the variables have the following meanings:
$E^{1C}$-$E^{5C}$ are each carbon or, for not more than one atom $E^{1C}$ to $E^{5C}$, phosphorus or nitrogen,
$A^C$ is —$NR^{5C}R^{6C}$, —$PR^{5C}R^{8C}$, —$OR^{5C}$, —$SR^{5C}$ or an unsubstituted, substituted or fused, partially unsaturated heterocyclic or heteroaromatic ring system,
$R^C$ is one of the following groups:

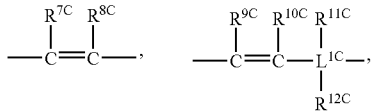

or, if $A^C$ is an unsubstituted, substituted or fused, partially unsaturated heterocyclic or heteroaromatic ring system, may also be

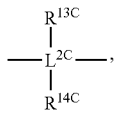

where
$L^{1C}$, $L^{2C}$ are each silicon or carbon,
$X^C$ is 1 or, if $A^{1C}$ is an unsubstituted, substituted or fused, partially unsaturated heterocyclic or heteroaromatic ring system, may also be 0,
$X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, $C_7$-$C_{40}$-alkylaryl, —$NR^{15C}R^{16C}$, —$OR^{15C}$, —$SR^{15C}$, —$SO_3R^{15C}$, —$OC(O)R^{15C}$, —CN, —SCN, β-diketonate, —CO, $BF_4^-$, $PF_6^-$ or a bulky noncoordinating anion,
$R^{1C}$-$R^{16C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, alkylaryl having from 1 to 10 carbon atoms in the alkyl part and 6-20 carbon atoms in the aryl part, $SiR^{17C}_3$, where the organic radicals $R^{1B}$-$R^{16B}$ may also be substituted by halogens and two geminal or vicinal radicals $R^{1C}$-$R^{16C}$ may also be joined to form a five- or six-membered ring,
$R^{17C}$ are each, independently of one another, hydrogen, $C_1$-$C_{20}$-alkyl, $C_2$-$C_{20}$-alkenyl, $C_6$-$C_{20}$-aryl, $C_7$-$C_{40}$-alkylaryl, and two geminal radicals $R^{17C}$ may also be joined to form a five- or six-membered ring,
$n^C$ is 1, 2 or 3 and
$m^C$ is 1, 2 or 3.

The transition metal $M^C$ is particularly preferably chromium.

Examples of organic transition metal compounds of the formula (III) are
1-(8-quinolyl)-2-methyl-4-methylcyclopentadienylchromium(III) dichloride,
1-(8-quinolyl)-3-isopropyl-5-methylcyclopentadienylchromium(III) dichloride,
1-(8-quinolyl)-3-tert-butyl-5-methylcyclopentadienylchromium(III) dichloride,
1-(quinolyl)-2,3,4,5-tetramethylcyclopentadienylchromium(III) dichloride,
1-(8-quinolyl)tetrahydroindenylchromium(III) dichloride,
1-(8-quinolyl)indenylchromium(III) dichloride,
1-(8-quinolyl)-2-methylindenylchromium(III) dichloride,
1-(8-quinolyl)-2-isopropylindenylchromium(III) dichloride,
1-(8-quinolyl)-2-ethylindenylchromium(III) dichloride,
1-(8-quinolyl)-2-tert-butylindenylchromium(III) dichloride,
1-(8-quinolyl)benzindenylchromium(III) dichloride,
1-(8-quinolyl)-2-methylbenzindenylchromium(III) dichloride,
1-(8-(2-methylquinolyl))-2-methyl-4-methylcyclopentadienylchromium(III) dichloride,
1-(8-(2-methylquinolyl))-2,3,4,5-tetramethylcyclopentadienylchromium(III) dichloride,
1-(8-(2-methylquinolyl))tetrahydroindenylchromium(III) dichloride,
1-(8-(2-methylquinolyl))indenylchromium(III) dichloride,
1-(8-(2-methylquinolyl))-2-methylindenylchromium(III) dichloride,
1-(8-(2-methylquinolyl))-2-isopropylindenylchromium(III) dichloride,
1-(8-(2-methylquinolyl))-2-ethylindenylchromium(III) dichloride,
1-(8-(2-methylquinolyl))-2-tert-butylindenylchromium(III) dichloride,
1-(8-(2-methylquinolyl))benzindenylchromium(III) dichloride or
1-(8-(2-methylquinolyl))-2-methylbenzindenylchromium(III) dichloride.

The preparation of functional cyclopentadienyl ligands has been known for a long time. Various synthetic routes for these complexing ligands are described, for example, by M. Enders et al. in Chem. Ber. (1996), 129, 459-463, or P. Jutzi und U. Slemeling in J. Orgmet. Chem. (1995), 500, 175-185.

The metal complexes, in particular the chromium complexes, can be obtained in a simple manner by reacting the corresponding metal salts, e.g. metal chlorides, with the ligand anion (e.g. by a method analogous to the examples in DE-A 197 10 615).

Further transition metal compounds A) which are suitable for the purposes of the present invention are imidochromium compounds of the formula (IV),

where the variables have the following meanings:
$R^D$ is $R^{1D}C=NR^{2D}$, $R^{1D}C=O$, $R^{1D}C=O(OR^{2D})$, $R^{1D}C=S$, $(R^{1D})_2P=O$, $(OR^{1D})_2P=O$, $SO_2R^{10}$, $R^{1D}R^{2D}C=N$, $NR^{1D}R^{2D}$ or $BR^{1D}R^{2D}$, $C_1$-$C_{20}$-alkyl, $C_1$-$C_{20}$-cycloalkyl, $C_2$-$C_{20}$-alkenyl, $C_6$-$C_{20}$-aryl, $C_7$-$C_{40}$-alkylaryl, hydrogen if this is bound to a carbon atom, where the organic radicals $R^{1D}$ and $R^{2D}$ may also bear inert substituents,
$X^D$ are each, independently of one another, fluorine, chlorine, bromine, iodine, —$NR^{3D}R^{4D}$, —$NP(R^{3D})_3$, —$OR^{3D}$, —$OSi(R^{3D})_3$, —$SO_3R^{3D}$, —$OC(O)R^{3D}$, β-diketonate, $BF_4^-$, $PF_6^-$ or a bulky weakly coordinating or noncoordinating anion,
$R^{1D}$-$R^{4D}$ are each, independently of one another, $C_1$-$C_{20}$-alkyl, $C_2$-$C_{20}$-alkenyl, $C_6$-$C_{20}$-aryl, $C_7$-$C_{40}$-alkylaryl; hydrogen if this is bound to a carbon atom, where the organic radicals $R^{1D}$ to $R^{4D}$ may also bear inert substituents,
$n^D$ is 1 or 2,
$m^D$ is 1, 2 or 3, where $m^{1D}$ is such that the metallocene complex of the formula (IV) is uncharged for the given valence of Cr, $L^D$ is an uncharged donor, and
$y^D$ is from 0 to 3.

Such compounds and their preparation are described, for example, in WO 01/09148.

Further suitable organic transition metal compounds A) are transition metal complexes with a tridentate macrocyclic ligand, e.g.

[1,3,5-tri(methyl)-1,3,5-triazacyclohexane]chromium trichloride,
[1,3,5-tri(ethyl)-1,3,5-triazacyclohexane]chromium trichloride,
[1,3,5-tri(octyl)-1,3,5-triazacyclohexane]chromium trichloride,
[1,3,5-tri(dodecyl)-1,3,5-triazacyclohexane]chromium trichloride and
[1,3,5-tri(benzyl)-1,3,5-triazacyclohexane]chromium trichloride.

Mixtures of various organic transition metal compounds can also be used as component A).

A further component, namely component B), used in the preparation of the catalyst is a mixture of at least two different organometallic compounds. In the process of the present invention, the organic transition metal compound A) is firstly brought into contact with the mixture of the organo metallic compounds.

Suitable organometallic compounds B) are ones of the formula (V), $$M^1(R^1)_r(R^2)_s(R^3)_t \quad (V)$$

where
$M^1$ is an alkali metal, an alkaline earth metal or a metal of group 13 of the Periodic Table, i.e. boron, aluminum, gallium, indium or thallium,
$R^1$ is hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_{10}$-$C_{10}$-alkoxy or halo-$C_7$-$C_{40}$-alkylaryl, halo-$C_7$-$C_{40}$-arylalkyl or halo-$C_1$-$C_{10}$-alkoxy,
$R^2$ and $R^3$ are each hydrogen, halogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy,
r is an integer from 1 to 3
and
s and t are integers from 0 to 2, where the sum r+s+t corresponds to the valence of $M^1$.

Among the metal compounds of the formula (V) preference is given to those in which
$M^1$ is lithium, magnesium or aluminum and
$R^1$, $R^2$ and $R^3$ are each hydrogen or $C_1$-$C_{10}$-alkyl.

Particularly preferred metal compounds of the formula (M) are n-butyllithium, n-butyl-n-octylmagnesium, n-butyl-n-heptylmagnesium, triphenylaluminum, triisoprenaluminum, tri-n-octyl-aluminum, tri-n-hexylaluminum, tri-n-butylaluminum, triisobutylaluminum, tri-n-propylaluminum, tri-isopropylatuminum, triethylaluminum or trimethylaluminum.

Furthermore, in the preparation of the catalyst, It is also possible to add the component B) or portions of the component B) in further steps in the catalyst preparation, i.e. apart from the reaction of the organic transition metal compound A) with the mixture of the organometallic compounds B), there can be an additional addition of individual-organometallic compounds, for example of the formula (V), or of mixtures of organometallic compounds.

As component C) in the preparation according to the present invention of the catalyst, use is made of at least one cation-forming compound. Suitable cation-forming compounds are, for example, strong uncharged Lewis acids, ionic compounds having Lewis-acid cations, ionic compounds containing Brönsted acids as cations or compounds of the aluminoxane type. The cation-forming compounds are frequently also referred to as compounds capable of forming metallocenium ions.

As strong uncharged Lewis acids, preference is given to compounds of the formula (VI)

$$M^2X^1X^2X^3 \quad (VI)$$

where
$M^2$ is an element of group 13 of the Periodic Table of the Elements, in particular B, Al or Ge and preferably B, and
$X^1$, $X^2$ and $X^3$ are each hydrogen, $C_1$-$C_{10}$-alkyl, $C_6$-$C_{15}$-aryl, alkylaryl, arylalkyl, haloalky or haloaryl each having from 1 to 10 carbon atoms in the alkyl radical and from 6 to 20 carbon atoms in the aryl radical or fluorine, chlorine, bromine or iodine, in particular haloaryl, preferably pentafluorophenyl.

Further examples of strong, uncharged Lewis acids are mentioned in WO 00/31090.

Particular preference is given to compounds of the formula (VI) in which $X^1$, $X^2$ and $X^3$ are identical, preferably tris(pentafluorophenyl)borane.

Suitable ionic compounds having Lewis-acid cations are salt-like compounds of the cation of the formula (VII)

$$[(Y^{a+})Q_1Q_2 \ldots Q_z]^{d+} \quad (VII)$$

where
Y is an element of groups 1 to 16 of the Periodic Table of the Elements,
$Q_1$ to $Q_z$ are singly negatively-charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_5$-$C_{15}$-aryloxy, silyl groups or mercaptyl groups,
a is an integer from 1 to 6 and
z is an integer from 0 to 5,
d corresponds to the difference a–z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are mentioned in WO 91/09882, preferably tetrakis(pentafluorophenyl)borate.

Salts having noncoordinating anions can also be prepared by combining a boron or aluminum compound, e.g. an aluminum alkyl, with a further compound which can react to link two or more boron or aluminum atoms, e.g. water, and a third compound which forms an ionizing ionic compound with the boron or aluminum compound, e.g. triphenylchloromethane. In addition, a fourth compound which likewise reacts with the boron or aluminum compound, e.g. pentafluorphenol, can also be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and derivatives of the last two.

Preferred ionic cation-forming compounds are, in particular, N,N-dimethylanilinium tetrakis(pentafluorophenyl)borate, N,N-dimethylcyclohexylammonium tetrakis(pentafluorophenyl)-borate and N,N-dimethylbenzylammonium tetrakis(pentafluorophenyl)borate.

It is also possible for two or more borate anions to be joined to one another, as in the dianion $[(C_6F_5)_2B—C_6F_4—B(C_6F_5)_2]^{2-}$, or the borate anion can be bound to the support surface via a bridge having a suitable functional group.

Further suitable cation-forming compounds are listed in WO 00/31090.

Suitable cation-forming compounds of the abovementioned types can also be obtained, for example, by reaction of organometallic compounds with organic compounds containing at least one functional group containing active hydrogen. Examples of suitable functional groups in the organic compounds are hydroxyl groups, primary and secondary amino groups, mercapto groups, silanol groups, carboxyl groups, amido groups or imido groups, with hydroxyl groups being preferred.

Preferred organic compounds containing hydroxyl groups are, in particular, those of the formula (VIII), $$(R^4)_x\text{-A-OH})_y \qquad (VIII)$$

where

A is an atom of main group 13, 14 or 15 of the Periodic Table or a group comprising from 2 to 20 carbon atoms, preferably an atom of main group 13 of the Periodic Table, in particular boron or aluminum, or a partially halogenated or perhalogenated $C_1$-$C_{20}$-alkyl or $C_6$-$C_{40}$-aryl group and is particularly preferably an atom of main group 13 of the Periodic Table, preferably boron or aluminum and in particular boron, $R^4$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_8$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl or $R^4$ is an $OSiR^{35}$ group, where $R^5$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalky, $C_7$-$C_{40}$-haloarylalkyl, $C_7$-$C_{40}$-alkylaryl or $C_7$-$C_{40}$-haloalkylaryl, and $R^4$ is preferably hydrogen, halogen, $C_6$-$C_{14}$-aryl, $C_6$-$C_{14}$-haloaryl, $C_1$-$C_{14}$-alkyl, $C_1$, $C_{14}$-haloalkyl, $C_7$-$C_{30}$-arylalkyl, $C_7$-$C_{30}$-haloarylalkyl, $C_7$-$C_{30}$-alkylaryl or $C_7$-$C_{30}$-haloalkylaryl and is particularly preferably $C_6$-$C_{10}$-aryl, $C_6$-$C_{10}$-haloaryl, $C_1$-$C_6$-alkyl, $C_1$-$C_6$-haloalkyl, $C_7$-$C_{20}$-alkylaryl or $C_7$-$C_{20}$-haloalkylaryl, y is at least 1 and is preferably from 1 to 5, in particular 1 or 2 and very particularly preferably 1, and x is an integer from 0 to 41, with particular preference being given to x being 2 when y is 1 or being 1 when y is 2.

Examples of preferred compounds of the formula (VIII) are borinic acids of the formula $R^4{}_2B(OH)$ or boronic acids of the formula $R^4B(OH)_2$.

Preferred organic compounds containing hydroxyl groups also include compounds having partially fluorinated or perfluorinated aryl groups, e.g. pentafluorophenol or nonafluorobiphenyl-1-ol or dihydroxyoctafluorobiphenyl. Such compounds C) can also be used in the form of an adduct with from 1 to 10 parts of water. These are then preferably compounds containing two OH groups, for example 4,4'-dihydroxyoctafluorobiphenyl.(s.H$_2$O), 1,2-dihydroxyoctafluorobiphenyl.(s.H$_2$O), 1,8-dihydroxyhexafluoronaphthalene.(s.H$_2$O) or 1,2-dihydroxyhexafluoronaphthalene.(s.H$_2$O), where s is from 1 to 10.

Suitable cation-forming compounds can be obtained from the organic compounds having functional groups containing active hydrogen by, in particular, reaction with organoaluminum compounds and particularly preferably with trialkylaluminums.

The amount of strong, uncharged Lewis acids, ionic compounds having Lewis-acid cations or ionic compounds containing Brönsted acids as cations is preferably from 0.1 to 20 equivalents, preferably from 1 to 10 equivalents, based on the organic transition metal compound.

As compounds of the aluminoxane type, it is possible to use, for example, the compounds described in WO 00/31090. Particularly useful compounds of this type are open-chain or cyclic aluminoxane compounds of the formula (IX) or (X)

where $R^6$ is a $C_1$-$C_4$-alkyl group, preferably a methyl or ethyl group, and m is an integer from 5 to 30, preferably from 10 to 25.

These oligomeric aluminoxane compounds are usually prepared by reaction of a solution of trialkylaluminum with water. In general, the oligomeric aluminoxane compounds obtained in this way are in the form of mixtures of both linear and cyclic chain molecules of various lengths, so that m is to be regarded as a mean. The aluminoxane compounds can also be present in admixture with other metal alkyls, preferably with aluminum alkyls.

Furthermore, in place of the aluminoxane compounds of the formula (IX) or (X), it is also possible to use modified aluminoxanes in which at least some of the hydrocarbon radicals or hydrogen atoms are replaced by alkoxy, aryloxy, siloxy or amide groups.

It has been found to be advantageous to use the organic transition metal compounds and the aluminoxane compounds in such amounts that the atomic ratio of aluminum from the aluminoxane compounds to the transition metal from the organic transition metal compound is in the range from 10:1 to 1000:1, preferably from 20:1 to 500:1 and in particular in the range from 30:1 to 400:1.

It is also possible to use mixtures of all the abovementioned cation-forming compounds. Preferred mixtures comprise aluminoxanes, in particular methylaluminoxane, and an ionic compound, in particular an ionic compound containing the tetrakis(pentafluorophenyl)borate anion, and/or a strong uncharged Lewis acid, in particular tris(pentafluorophenyl)borane.

Both the organic transition metal compound and the caton-forming compound are preferably used in a solvent, with aromatic hydrocarbons having from 6 to 20 carbon atoms, in particular xylenes and toluene, being preferred.

In a preferred embodiment of the process of the present invention, at least one support is used as component D) for preparing the olefin polymerization catalyst. Such supports are preferably finely divided supports which may be any organic or inorganic, inert solid. In particular, the support component D) can be a porous support such as talc, a sheet silicate, an in organic oxide or a finely divided polymer powder.

Inorganic oxides suitable as supports may be found among oxides of the elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used on their own or in combination with the abovementioned oxidic supports are, for example, $ZrO_2$ or $B_2O_3$. Preferred oxides are silicon dioxide, in particular in the form of a silica gel or a pyrogenic silica, or aluminum oxide. A preferred mixed oxide is, for example, calcined hydrotalcite.

The support materials used preferably have a specific surface area in the range from 10 to 1000 m$^2$/g, preferably from 50 to 500 m$^2$/g and in particular from 200 to 400 m$^2$/g, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 µm, preferably from 5 to 350 µm and in particular from 10 to 100 µm.

The inorganic support can be subjected to a thermal treatment, e.g. for removing adsorbed water. Such a drying treatment is generally carried out at from 80 to 300° C., preferably from 100 to 200° C., and is preferably carried out under reduced pressure and/or in a stream of inert gas, for example nitrogen or argon. The inorganic support can also be calcined, in which case the concentration of OH groups on the surface is adjusted and the structure of the solid may be altered by a treatment at from 200 to 1000° C. The support can also be treated chemically using customary desiccants such as metal alkyls, preferably aluminum alkyls, chlorosilanes or $SiCl_4$, or else methyl-aluminoxane. Appropriate treatment methods are described, for example, in WO 00/31090.

The inorganic support material can also be chemically modified. For example, the treatment of silica gel with $NH_4SiF_8$ leads to fluorination of the silica gel surface and treatment of silica gels with silanes containing nitrogen-, fluorine- or sulfur-containing groups gives correspondingly modified silica gel surfaces.

Further possible support materials include finely divided polymer powders, for example polyolefins such as polyethylene or polypropylene or polystyrene. They should preferably be freed of any adhering moisture, solvent residues or other impurities by appropriate purification or drying operations before use. It is also possible to use functionalized polymeric supports, e.g. supports based on polystyrenes, via whose functional groups, for example ammonium or hydroxide groups, at least one of the catalyst components can be immobilized.

In a further preferred embodiment, at least one Lewis base is used as component E). Suitable Lewis bases generally have the formula (XI), $$M^3R^6R^7R^8 \tag{XI}$$

where $R^6$, $R^7$ and $R^8$ are identical or different and are each a hydrogen atom, a $C_1$-$C_{20}$-alkyl group, a $C_1$-$C_{20}$-haloalkyl group, a $C_6$-$C_{40}$-aryl group, a $C_6$-$C_{40}$-haloaryl group, a $C_7$-$C_{40}$-alkylaryl group or a $C_7$-$C_{40}$-arylalkyl group, preferably a $C_7$-$C_{40}$-arylalkyl group, where two radicals or all three radicals $R^3$, $R^4$ and $R^5$ may be joined to one another via $C_2$-$C_{20}$ units, $M^3$ is an element of group 15 of the Periodic Table of the Elements, $R^6$, $R^7$ and $R^8$ are preferably $C_1$-$C_{20}$-alkyl, $C_6$-$C_{40}$-aryl or $C_7$-$C_{40}$-alkylaryl. It is particularly preferred that at least one of $R^6$, $R^7$ and $R^8$ is a $C_7$-$C_{40}$-arylalkyl group, for example benzyl.

$M^3$ is preferably nitrogen or phosphorus, in particular nitrogen.

Examples of Lewis bases used as component E) are methylamine, aniline, dimethylamine, diethylamine, N-methylaniline, diphenylamine, trimethylamine, triethylamine, tripropylamine, tributylamine, N,N-dimethylaniline, N,N-diethylaniline or N,N-dimethylcyclohexylamine. Particularly preferred Lewis bases are, for example, benzylamine, N-benzyldimethylamine, N-benzyldiethylamine, N-benzylbutylamine, N-benzyl-tert-butylamine, N'-benzyl-N,N-dimethylethylenediamine, N-benzylethylenediamine, N-benzylisopropylamine, N-benzylmethylamine, N-benzylethylamine, N-benzyl-1-phenylethylamine, N-benzyl-2-phenylethylamine or N-benzylpiperazine.

When a Lewis base E) is used, preference is given to this firstly being reacted with the support and the support which has been modified in this way then being brought into contact with the further components.

The process of the present invention for preparing the catalysts is carried out by bringing the components A) to C) and, if desired, D) and E) into contact with one another in any order. All components can be added individually in succession, but it is also possible for individual components to be mixed with one another initially and these mixtures then to be brought into contact with other mixtures and/or individual components, provided that the organic transition metal compound A) is firstly combined with the mixture of the organometallic compounds B) before the reaction product is then brought into contact with a further component or a mixture of further components of the catalyst.

A preferred way of bringing the components into contact with one another is firstly to bring the organic compound having at least one functional group containing active hydrogen C) into contact with the organometallic compound B), with a portion of the organometallic compound B) or, when a mixture of different organometallic compounds is used, with at least one of the constituents of the component B).

The components are usually combined in the presence of an organic solvent in which the support D) which is preferably used, the reaction products of the support and/or the catalyst solid formed are suspended. Suitable solvents include aromatic or aliphatic solvents, for example hexane, heptane, toluene or xylene or halogenated hydrocarbons such as methylene chloride or halogenated aromatic hydrocarbons such as o-dichlorobenzene.

The components are generally combined at from −20° C. to 150° C., preferably in the range from 0° C. to 100° C. When not all of the components are brought into contact simultaneously, the temperature in the individual steps of the combination can be the same. However, the temperatures in the individual steps can also be different The time for which the compounds which are being brought into contact with one another are allowed to react is generally from 1 minute to 48 hours. Preference is given to reaction times of from 10 minutes to 6 hours. When the components are brought into contact with one another in steps, the reaction times in the individual steps are usually from 1 minute to 6 hours and preferably from 10 minutes to 2 hours.

The ratios in which the components are preferably used are as follows:

The molar ratio of any Lewis base E) used to cation-forming compound C) is preferably from 0.05:1 to 2:1, in particular from 0.1:1 to 1:1.

The molar ratio of organic transition metal compound A) to cation-forming compound C) is preferably from 1:0.1 to 1:1000, in particular from 1:1 to 1:100.

When a support D) is used, the catalyst solid can firstly be prepolymerized with α-olefins, preferably linear $C_2$-$C_{10}$-1-alkenes and in particular ethylene or propylene, and the resulting prepolymerized catalyst solid can then be used in the actual polymerization. The mass ratio of catalyst solid used in the prepolymerization to polymerized-on monomer is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of a supported catalyst. The molar ratio of additives to organic transition metal compound A) is usually from 1:1000 to 1000:1, preferably from 1:5 to 20:1.

The polymerization can be carried out in a known manner, in bulk, in suspension, in the gas phase or in a supercritical medium in the customary reactors used for the polymerization of olefins. It can be carried out batchwise or preferably continuously in one or more stages. Solution processes, suspension processes, stirred gas-phase processes or gas-phase fluidized-bed processes are all possible. As solvent or suspension medium, it is possible to use inert hydrocarbons, for example isobutane, or else the monomers themselves.

The polymerizations can be carried out at from 60 to 300° C. and pressures in the range from 0.5 to 3000 bar. Preference is given to temperatures in the range from 50 to 200° C., in particular from 60 to 100° C., and pressures in the range from 5 to 100 bar, in particular from 15 to 70 bar. The mean residence times are usually from 0.5 to 5 hours, preferably from 0.5 to 3 hours. Molar mass regulators, for example hydrogen, or customary additives such as antistatics can also be used in the polymerization.

The process of the present invention for preparing catalysts for olefin polymerization is relatively simple and catalysts having a good polymerization activity can be prepared using a reduced amount of expensive starting materials such as transition metal compounds or boron-containing compounds. In particular, it is possible to use organic transition metal compounds having a low solubility in customary solvents for preparing catalysts for olefin polymerization. It is also possible to prepare catalysts having an increased polymerization activity.

EXAMPLES

Example 1 a) Synthesis of the Supported Cocatalyst 5 ml of trimethylaluminum (2 M in toluene, 10 mmol) together with 45 ml of toluene were placed in a reaction vessel. At −10° C., a solution of 7 g of bis(pentafluorophenyl)borinic acid (20 mmol) in 50 ml of toluene was slowly added to the trimethylaluminum solution over a period of 15 minutes. The mixture was brought to room temperature and stirred for one hour. 7 g of silica gel (XPO 2107, Grace) were suspended in 30 ml of toluene, and 1.4 ml of N,N-dimethylbenzylamine were added to this suspension at room temperature. The mixture was cooled to 0° C. and the solution prepared above was slowly added. The mixture was subsequently warmed to room temperature and stirred for 3 hours. The suspension was then filtered and the solid was washed with heptane. The residue was dried to constant weight in an oil pump vacuum. This gave 11.2 g of a white support material.

b) Application of the Organic Transition Metal Compound to the Support

250 µmol of trimethylaluminum (20% strength in a high-boiling dearomatized hydrocarbon mixture) and 250 µmol of triisobutylaluminum (20% strength in a high-boiling dearomatized hydrocarbon mixture) were added to a suspension of 37 mg of dimethylsilanediylbis(2-methyl (4'-tert-butylphenyl)indenyl)zirconium dichloride (50 µmol) in 25 ml of toluene and the mixture was stirred at 50° C. for 1 hour. 2.2 g of the support prepared in Example 1a) were subsequently added at room temperature. The catalyst solution was stirred for 1 hour and the solvent was then taken off in an oil pump vacuum. This resulted in an orange; free-flowing powder.

c) Polymerization

A dry 16 l reactor was flushed firstly with nitrogen and subsequently with propylene and then charged with 10 l of liquid propylene and 5 standard liters of hydrogen. 13.3 ml of triisobutylaluminum (20% strength in a high-boiling dearomatized hydrocarbon mixture) were added and the mixture was stirred for 15 minutes. 0.23 g of the catalyst solid prepared in Example 1b) were subsequently suspended in 20 ml of heptane and introduced into the reactor via a lock and were rinsed in using 15 ml of heptane. The reaction mixture was heated to the polymerization temperature of 65° C. and polymerized for 1 hour. This resulted in 1860 g of pulverulent polypropylene, corresponding to a productivity of 8.1 kg of PP/g of catalyst solid. The reactor had no deposits on the interior wall or on the stirrer.

Comparative Example A a) Synthesis of the Supported Cocatalyst

The supported cocatalyst prepared in Example 1a) was used.

b) Application of the Organic Transition Metal Compound to the Support

The procedure of Example 1b) was repeated using 500 µmol of trimethylaluminum in place of the mixture of 250 µmol of trimethylaluminum and 250 mmol of triisobutylaluminum. This resulted in an orange, free-flowing powder.

c) Polymerization

The polymerization was carried out as in Example 1c), but using 1.15 g of the catalyst solid prepared in comparative example Ab) in 20 ml of heptane. This resulted in 3610 g of pulverulent polypropylene, corresponding to a productivity of 3.1 kg of PP/g of catalyst solid. After the polymerization, deposits were found on the interior wall of the reactor and on the stirrer.

Example 2 a) Catalyst Synthesis 30 mg of dimethylsilanediylbis(2-methyl-4-(4'-tert-butylphenyl)indenyl)zirconium dichloride, 0.15 ml of triethylaluminum and 0.26 ml of a 20% strength by weight solution of triisobutylaluminum in a high-boiling dearomatized hydrocarbon mixture were suspended in 20 ml of toluene and stirred at 50° C. until a clear solution was obtained. The yellow solution was subsequently brought to room temperature and admixed with 0.69 ml of a 20% strength by weight solution of trimethylaluminum in a high-boiling dearomatized hydrocarbon mixture and 1 g of bis(pentafluorophenyl)borinic acid. After stirring for one hour, 0.1 ml of dimethylbenzylamine was added, and after stirring for a further 30 minutes, 2 g of silica gel (XPO 2107 from Grace) were added. After stirring for another 1 hour, the solvent was distilled off at 50° C. under reduced pressure. This gave 3.09 g of a salmon-colored, free-flowing powder.

b) Polymerization

A dry 2 l reactor was flushed firstly with nitrogen and subsequently with propylene and then charged with 1.5 l of liquid propylene. 3 ml of a 20% strength by weight solution of triisobutylaluminum in a high-boiling dearomatized hydrocarbon mixture were added and the mixture was stirred for 15 minutes. 250 mg of the catalyst system prepared in Example 2a) were subsequently suspended in 20 ml of heptane and introduced into the reactor via a lock and were rinsed in using 15 ml of heptane. The reaction mixture was heated to the polymerization temperature of 65° C. and polymerized for 1 hour. This resulted in 450 g of pulverulent polypropylene, corresponding to a productivity of 1.8 kg of PP/g of catalyst solid or an activity of 2.4 kg of PP/mmol of B or 158 kg of PP/mmol of Zr×h. The reactor had no deposits on the interior wall or on the stirrer.

Example 3 a) Catalyst Synthesis 0.69 ml of trimethylaluminum and 10 ml of toluene were placed in a reaction vessel and admixed at room temperature with 1 g of bis(pentafluorophenyl)borinic acid. After stirring at room temperature for one hour, 0.1 ml of dimethylbenzylamine were added and the mixture was stirred for a further 15 minutes. A solution of 30 mg of dimethylsilanediylbis(2-methyl-4-(4'-tert-butylphenyl)indenyl)zirconium dichloride, 0.15 ml of triethylaluminum and 0.26 ml of triisobutylaluminum in 20 ml of toluene were subsequently added. After stirring at room temperature for 15 minutes, 2.5 g of silica gel (XPO 2107 from Grace) were added and the mixture was stirred at room temperature for 1 hour. The solvent was subsequently distilled off at 50° C. under reduced pressure. This gave 3.57 g of a salmon-red, free-flowing powder.

b) Polymerization

A dry 16 l reactor was flushed firstly with nitrogen and subsequently with propylene and then charged with 10 l of liquid propylene. 6 ml of a 20% strength by weight solution of triisobutylaluminum in a high-boiling dearomatzed hydrocarbon mixture were added and the mixture was stirred for 15 minutes. 5 standard liters of hydrogen were subsequently metered in and the mixture was stirred for another 15 minutes. 250 mg of the catalyst system prepared in Example 3a) were suspended in 20 ml of heptane and introduced into the reactor via a lock and were rinsed in using 15 ml of heptane. The reaction mixture was heated to the polymerization temperature of 65° C. and polymerized for 1 hour. This resulted in 2.1 kg of pulverulent polypropylene, corresponding to a productivity of 8.4 kg of PP/g of catalyst solid or an activity of 11 kg of PP/mmol of B or 740 kg of PP/mmol of Zr×h. The reactor had no deposits on the interior wall or on the stirrer.

Example 4 a) Catalyst Synthesis 1.5 g of silica gel (XPO 2107 from Grace) were suspended in 20 ml of toluene. Firstly 0.15 ml of a 20% strength by weight solution of triethylaluminum and 0.26 ml of a 20% strength by weight solution of triisobutylaluminum in a high-boiling dearomatized hydrocarbon mixture and subsequently 30 mg of dimethylsilanediylbis(2-methyl-4-(4'-tert-butylphenyl)indenyl)zirconium dichloride and 0.2 ml of dimethylbenzylamine were then added. The mixture was subsequently heated to 50° C. and stirred until a clear solution was obtained. A mixture of 1 g of bis(pentafluorophenyl)borinic acid, 0.69 ml of a 20% strength by weight solution of trimethylaluminum in a high-boiling dearomatized hydrocarbon mixture and 10 ml of toluene was added at room temperature. After stirring at room temperature for 1 hour, the solvent was distilled off at 50° C. under reduced pressure. This gave 2.37 g of a salmon-colored, free-flowing powder.

b) Polymerization

A dry 2 l reactor was flushed firstly with nitrogen and subsequently with propylene and then charged with 1.5 l of liquid propylene. 3 ml of a 20% strength by weight solution of triisobutylaluminum in a high-boiling dearomatized hydrocarbon mixture were added and the mixture was stirred for 15 minutes. 250 mg of the catalyst system prepared in Example 4a) were subsequently suspended in 20 ml of heptane and introduced into the reactor via a lock and rinsed in using 15 ml of heptane. The reaction mixture was heated to the polymerization temperature of 65° C. and polymerized for 1 hour. This resulted in 169 g of pulverulent polypropylene, corresponding to a productivity of 0.7 kg of PP/g of catalyst solid or an activity of 0.6 kg of PP/mmol of B or 40 kg of PP/mmol of Zr×h. The reactor had no deposits on the interior wall or on the stirrer.

We claim:

1. A process for preparing a catalyst for olefin polymerization comprising the steps by bringing (A) at least one organic transition metal compound, (B) a mixture of at least two different organo metallic compounds of formula (V), $$M^1(R^1)_r(R^2)_s(R^3)_t \qquad (V)$$

where $M^1$ is an alkali metal, an alkaline earth metal or a metal of group 13 of the Periodic Table, $R^1$ is hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy, halo-$C_7$-$C_{40}$-alkylaryl, halo-$C_7$-$C_{40}$-arylalkyl or halo-$C_1$-$C_{10}$-alkoxy, $R^2$ and $R^3$ are each hydrogen, $C_1$-$C_{10}$-alkyl, $C_6$-$C_{15}$-aryl, halo-$C_1$-$C_{10}$-alkyl, halo-$C_6$-$C_{15}$-aryl, $C_7$-$C_{40}$-arylalkyl, $C_7$-$C_{40}$-alkylaryl, $C_1$-$C_{10}$-alkoxy or halo-$C_7$-$C_{40}$-alkylaryl, halo-$C_7$-$C_{40}$-arylalkyl or halo-$C_1$-$C_{10}$-alkoxy, r is an integer from 1 to 3 and s and t are integers from 0 to 2, where the sum r+s+t corresponds to the valence of $M^1$, and C) at least one cation-forming compound into contact with one another, wherein the organic transition metal compound A) is firstly combined with the mixture of the organo metallic compounds B).

2. A process for preparing a catalyst for olefin polymerization as claimed in claim1, wherein D) at least one support is used as further component.

3. A process for preparing a catalyst for olefin polymerization as claimed in claim 2, wherein E) at least one Lewis base is used as further component.

4. A process for preparing a catalyst for olefin polymerization as claimed in claim 3, wherein the cation-forming compound is a strong uncharged Lewis acid, an ionic compound having a Lewis-acid cation, an ionic compound containing a Brönsted acid as cation or an aluminoxane or a modified aluminoxane in which at least some of the hydrocarbon radicals are replaced by alkoxy, aryloxy, siloxy or amide groups.

5. A process for preparing a catalyst for olefin polymerization as claimed in claim 4, wherein the at least one cation-forming compound is obtained during the preparation of the catalyst by reacting a compound having at least one functional group containing active hydrogen with an organometallic compound.

6. A process for preparing a catalyst for olefin polymerization as claimed in claim 1, wherein
    B) at least one Lewis base
    is used as further component.

7. A process for preparing a catalyst for olefin polymerization as claimed in claim 1, wherein the cation-forming compound is a strong uncharged Lewis acid, an ionic compound having a Lewis-acid cation, an ionic compound containing a Brönsted acid as cation, an aluminoxane or a modified aluminoxane in which at least some of the hydrocarbon radicals are replaced by alkoxy, aryloxy, siloxy or amide groups.

8. A process for preparing a catalyst for olefin polymerization as claimed in claim 1, wherein the at least one cation-forming compound is obtained during the preparation of the catalyst by reacting a compound having at least one functional group containing active hydrogen with an organometallic compound.

9. A process for preparing a catalyst for olefin polymerization as claimed in claim 8, wherein the compound having at least one functional group containing active hydrogen is a hydroxyl-containing compound.

10. A process for preparing a catalyst for olefin polymerization as claimed in claim 9, wherein the hydroxyl groups are bound to an element of main group 13, 14 or 15 of the Periodic Table.

* * * * *

UNITED STATES PATENT AND TRADEMARK OFFICE
CERTIFICATE OF CORRECTION

| | | |
|---|---|---|
| PATENT NO. | : 7,285,513 B2 | Page 1 of 1 |
| APPLICATION NO. | : 10/521076 | |
| DATED | : October 23, 2007 | |
| INVENTOR(S) | : Roland Kratzer et al. | |

It is certified that error appears in the above-identified patent and that said Letters Patent is hereby corrected as shown below:

In Claim 2, in column 24, on line 58, "as claimed in claimi, wherein" should read -- as claimed in claim 1, wherein --.

In Claim 4, in column 25, on line 3, "containing a Brönsted acid as cation or an aluminoxane" should read -- containing a Brönsted acid as cation, an aluminoxane --.

In Claim 6, in column 25, on line 15, "B) at least one Lewis base" should read -- E) at least one Lewis base --.

Signed and Sealed this

Twenty-fifth Day of December, 2007

JON W. DUDAS
*Director of the United States Patent and Trademark Office*